UNITED STATES PATENT OFFICE.

CHARLES RAVE, OF MALINES, BELGIUM.

PROCESS OF UTILIZING ACID-TAR RESIDUUMS.

SPECIFICATION forming part of Letters Patent No. 425,905, dated April 15, 1890.

Application filed May 29, 1888. Serial No. 275,496. (No specimens.) Patented in Belgium May 10, 1887, No. 77,403, and in England January 14, 1888, No. 607.

*To all whom it may concern:*

Be it known that I, CHARLES RAVE, chemist, a subject of the King of Belgium, residing at Malines, in the Kingdom of Belgium, have invented certain new and useful Improvements in the Process of Utilization of Acid-Tar Residuums, (for which I have obtained provisional protection in England, No. 607, dated January 14, 1888, and in Belgium, No. 77,403, dated May 10, 1887,) of which the following is a specification.

In spite of the great progress realized during the last thirty years in the study of tarry hydrocarbons there are yet found in many industries great quantities of those very cumbersome products having little or no value. This is the case, among others, in the manufacture of gas from mineral oils, from waste animal and vegetable matters, from schists or shales of various origins, boghead, cannel-coal, lignite, ordinary coal, &c., the distillation and purification of vegetable, animal, and mineral oil matters, whether solid or liquid.

My researches have been directed to the utilization by transformation of all the hydrocarbonaceous products resulting from the industrial processes indicated above. To arrive at these results I have made use of one general process of manufacture, which I will describe below, but which requires certain modifications, according to the various materials which I make use of and according to the various products which I wish to obtain.

The tars or tarry matters produced in the manufactures enumerated at the commencement of this description are treated first by concentrated sulphuric acid, save in the case where the tars are already the result of the treatment of an oil by an acid. This treatment is done either cold or hot, according as the tar is solid, pasty, or liquid, and in effect the nature of these tars is excessively variable, and naturally the manner of treating them must vary in consequence. In any case we usually render the sulphuric acid fuming by the addition of a small quantity of nitric acid. For some purposes hydrochloric acid or other strong acid is available.

After a more or less prolonged contact there is produced in the material treated a separation. The oily matters come to the surface if the tars contain them. These oily matters are taken off and utilized industrially as greases or oils. There remains a mixture or compound of acid and hydrocarbons. This mixture is introduced into a closed reservoir having only an aperture sufficient for the escape of the gases which form during the decomposition. A certain quantity of water is added, sufficient, after the iron hereinafter mentioned has been added and combined, to form and dissolve all the sulphate of iron resulting. Say to every ninety-six parts, by weight, of $SO_4$ in the original acid tar fifty-six parts of iron and one hundred and eighty parts of water are theoretically required. In practice the proportions are to every five parts, by weight, of $SO_4$ in the crude tar three of iron and ten of hot water or steam are required. If, however, the material is allowed to cool before separating the solution from the bitumen, more water must be used or the bitumen is apt to set solid. The addition of water produces considerable heat. Then I introduce a quantity (varying with the quantity of acid contained) of an easily-oxidizable metal, iron filings or borings by preference, because of their low price and the useful products to which they gave birth; but copper or zinc, or other easily-oxidizable metal forming a soluble salt with the acid employed, will do. The materials are well mixed, and are subject to a maceration more or less prolonged, either at the natural temperature or with steam heat and varying from two to eight days. The iron combines with the acid, so as to form sulphate of iron. The bituminous matter, which was previously liquid, hardens gradually as it separates from its acid combination.

My process can also be used for some tars which are not combined with acid or where the acid process is dispensed with. The tars in this case are mixed with the metallic iron and the whole macerated with water, preferably nearly boiling, until the iron is oxidized at the expense of the water. In this case, however, it is well to have sal-ammoniac or a little acid in the water to assist the oxidation. This treatment is comparatively exceptional. In most cases acid is required to perform the work. The product obtained by this process is a pure bituminous body possessing different properties and qualities, and varying according to the nature of the material from which it has been obtained. For example, the tars obtained in the manufacture of rich gas from mineral oils, schists, boghead, &c., give pure bituminous products, very hard and insoluble in petroleum, naphtha, and bisulphide of carbon, but soluble in the ethers from shales or from coal or the light oils of similar origin. The tars formed from coal-gas give analogous products to the preceding. The tars from petroleum give pure bituminous bodies, but soluble in naphtha and bisulphide of carbon. The tars by the treatment of organic matters, vegetable or animal, give bituminous products soluble in naphtha and bisulphide of carbon. These bitumens are of great density, very elastic, and susceptible of numerous applications. However it be, the treatment above described produces a transformation of the organic matters contained in the tars treated and gives birth to a bituminous body possessing properties differing from those of natural bitumens or of pitch obtained by distillation. As has been said already, the products obtained vary according to the origin of the tars which have given them birth, and they are divided into several classes, according to their properties and the primary matters from which they have been extracted.

The general characters of the bitumens obtained by the process which I have described are the following: They are neither decomposed by acids nor by alkalies. They are inoxidizable and are not attacked by water or humidity. They can be employed in their natural state alone or mixed with other substances. They are electric insulators of the very first order, and will therefore render great services in electrical applications. They can be used alone or mixed with tissues or textile fabrics, or fibrous matter or hard matters, or matters capable of being made hard. They can be made into boxes for accumulators or receptacles for acids or alkalies. They can form isolating compositions. Spread on paper or cloth, they constitute excellent preservatives from humidity. They can be employed in all those cases where natural bitumens are valuable, such as for asphalting pavements, impermeable products, &c. Pure or mixed with sawdust or tan, powder of coke, carbon, the ravelings of linen, canvas, paper, cuttings, &c., they make excellent solid combustibles, rich in gas and calorific powder, according to the quantity of the foreign material that has been added and the degree of compression of the briquettes, while they have not the disagreeable odor of briquettes agglomerated by natural asphalt. The stuffs or papers dipped into this artificial bitumen, which has been previously melted and compressed afterward in a press in one or several thicknesses, give a product which has been called "mineral linoleum leather," and which can be employed advantageously in shoe-making, manufacture of trunks, the imitation of Cordova leather, of embossed leather, moldings, and other analogous uses. These bitumens can be transformed into black varnish capable of resisting very high temperatures. They can serve for covering the flues of chimneys, steam-boilers, and the cylinders of machines. They can be employed in the interior of boilers, resisting very long and preventing incrustations from adhering to the front.

The prepared bitumen submitted to a fractional distillation gives a series of oils from light naphtha to heavy lubricating-oils, and leaving as a residue a peculiar charcoal excessively hard and not containing any foreign matter, except a very minute quantity of iron in a peculiar state, which has not been defined, and which gives to this carbon peculiar properties. It is a better conductor than the ordinary carbons and diminishes notably the proportion of polarization of all the batteries in which it is employed.

The hard bitumen obtained from the distillation of oils of shale and coal can be reduced by crushing into an impalpable powder, which only becomes sticky at a relatively high temperature. This powder can be utilized to produce dry mixtures with other matters—such as sawdust, tan, powder of coke and of charcoal—and by only heating and subsequent compression into combustible briquettes.

I declare that what I claim is—

1. The process of manufacturing bitumen and other products from crude oils, tars, pitches, and other hydrocarbonaceous matters, which consists in treating the crude hydrocarbons with sulphuric acid at a suitable temperature, thus forming clear oil or grease and an acid tar, macerating the acid tar with water and granular metal, such as described, out of contact with air, till the sulphuric acid and metal have combined, distilling the bitumen by fractional distillation, obtaining thereby various naphthas and oils till the residue is sufficiently hard for the purpose required, substantially as described.

2. The process of separating bitumen from crude oils or hydrocarbons, which consists in treating the crude hydrocarbons with sulphuric acid till the tarry matters separate from the clear oil, and treating these tarry matters with water or steam and a granular metal that will easily combine with sulphuric acid, and separating the aqueous solution containing the salts from the bitumen.

3. The process of utilizing acid-tar residues, which consists in macerating them with iron cuttings or borings and steam or water in a closed chamber till the acid combines with the iron and is dissolved out in the water, separating the solution, then distilling the hydrocarbonaceous mass, and collecting the naphtha and oil therefrom.

4. The process of manufacturing bitumen from acid-tar residues, which consists in causing the acid to combine with the metal—to wit, iron, copper, manganese, or zinc—and subsequently washing out the salts formed.

5. The process of manufacturing insulating material from acid-tar residues, which consists in neutralizing the acid thereof by means of a metal capable of combining with the acid used and water or steam, and washing out the salts formed, and distilling the bitumen till the residue is hard enough for the purposes required.

In testimony whereof I have signed my name to this specification in the presence of two subscribing witnesses.

CHARLES RAVE.

Witnesses:
 EMILE TUARD,
 AUG. JOERISSEN.